United States Patent [19]

Mizuno et al.

[11] Patent Number: 5,409,407
[45] Date of Patent: Apr. 25, 1995

[54] ELECTRIC CONNECTOR TERMINAL PIECES, ELECTRIC CONNECTORS AND ELECTRIC CONNECTORS ASSEMBLING METHOD

[75] Inventors: Yoshiyuki Mizuno, Sagamihara; Hidehiro Ii, Koube, both of Japan

[73] Assignee: Molex Incorporated, Lisle, Ill.

[21] Appl. No.: 238,762

[22] Filed: May 5, 1994

[30] Foreign Application Priority Data

Aug. 25, 1993 [JP] Japan .................. 5-232520

[51] Int. Cl.6 .................. H01R 4/26; H01R 13/11
[52] U.S. Cl. .................. 439/860; 439/441
[58] Field of Search .............. 439/849, 850, 860, 842, 439/495, 441, 883

[56] References Cited

U.S. PATENT DOCUMENTS

| 2,725,544 | 11/1955 | Strange | 439/441 |
| 3,546,656 | 12/1970 | Pvitulsky | 439/860 |
| 3,622,954 | 11/1971 | Hounanian et al. | 439/860 |
| 4,519,133 | 5/1985 | Pansanel | 29/863 |
| 4,629,271 | 12/1986 | Awano | 439/260 |
| 4,695,108 | 9/1987 | Ichitsubo | 439/59 |
| 4,734,053 | 3/1988 | Imai | 439/329 |
| 4,775,337 | 10/1988 | Van Wagener et al. | 439/883 |
| 4,790,772 | 12/1988 | Schulte et al. | 439/439 |
| 4,900,268 | 2/1990 | Kunishi | 439/493 |
| 4,969,840 | 11/1990 | Ii et al. | 439/495 |
| 5,106,311 | 4/1992 | Yodogawa et al. | 439/77 |
| 5,194,017 | 3/1993 | Consoli | 439/492 |
| 5,240,430 | 8/1993 | Soes | 439/260 |
| 5,287,028 | 2/1994 | Suzuki et al. | 310/71 |

FOREIGN PATENT DOCUMENTS

72189  6/1978  Japan .................. 439/460

*Primary Examiner*—Gary F. Paumen
*Attorney, Agent, or Firm*—Stephen Z. Weiss

[57] ABSTRACT

Disclosed is an improved electric connector which is designed to be integrally connected to an electric machine or apparatus, assuring the good electric connection to the input terminals of an electric machine or apparatus. Each terminal of the electric connector has a slit in its tail, the main slit-defining edges being used to make an electric connection with each input terminal of the electric machine or apparatus.

6 Claims, 12 Drawing Sheets

ELECTRIC CONNECTOR TERMINAL PIECES, ELECTRIC CONNECTORS AND ELECTRIC CONNECTORS ASSEMBLING METHOD

FIELD OF THE INVENTION

The present invention relates to electric connector terminals, electric connectors and an electric connector assembling method, particularly to an improvement in or relating to electric connector terminals and electric connectors designed to be integrally connected to blade terminals on electric machines and appliances.

BACKGROUND OF THE INVENTION

As is well known, required electric connections between the input terminals (or electrodes) of electric machines and appliances such as small-sized electric motors and associated electric power supplies or controls were made by soldering or crimping wires to the input terminals (or electrodes) of electric machines and appliances and to the conductors extending from the electric power supplies or controls.

Such wire-soldered or wire-crimped connections, however, required laborious works, and still disadvantageously, connection to and disconnection from exterior conductors could not be performed with ease.

U.S. Pat. No. 5,287,028 proposed a connector housing integrally connected to an electric motor. The connector housing has an electric connector fitted therein with the inner terminals designed to be connected to the input terminals of the electric motor and the outer terminals designed to be detachably connected to the exterior lead wires extending from an associated power supply or control for making required electric connections between the electric motor and the associated power supply or control.

In this prior art the input terminals of the electric machine or apparatus rise upright from the casing of the electric machine or apparatus, extending toward the connector housing whereas the inner terminals of the electric connector rise upright from the connector housing, extending toward the casing of the electric machine or apparatus. Required electric connections can be made by forcing the connector housing against the electric motor with the inner terminals of the connector in alignment with the input terminals of the electric motor. The inner terminals of the electric connector are cut-and-raised strips of sheet metal. These strips are forced into contact with selected input terminals of electric motor when the connector housing is applied to the electric motor.

The cut-and-raised strips or inner terminals of the electric connector are liable to be deformed or inclined by undesired exterior force before the connector housing is applied to the casing of the electric motor. This could cause incomplete connections between the inner terminals of the electric connector and the input terminals of the electric motor. Likewise, the outer terminals of the electric connector extending out of the connector housing are liable to be deformed or inclined by undesired exterior force before being connected to exterior conductors. This causes inconvenience in connecting the electric motor to an associated power supply or control.

SUMMARY OF THE INVENTION

One object of the present invention is to provide an electric connector structure guaranteed free of incorrect alignment of the terminals of the electric connector relative to the input terminals of an associated electric machine or apparatus such as an electric motor, and hence free of any incomplete connection between the electric machine or apparatus and the power supply or control.

Another object of the present invention is to provide a method of assembling such an electric connector with an increased efficiency.

To attain these objects a low profile electrical connector is provided for mating with a blade terminal. The connector has a housing with a terminal receiving cavity and a female terminal mounted in the cavity having a mating end to engage the blade terminal. The mating end of the terminal has a generally planar portion that is transverse to the direction of insertion of the blade terminal. The planar portion has an opening formed therein to receive the blade terminal. The opening is defined by two spaced-apart sides where each side is adapted to engage an opposing surface of the blade terminal when mated. One of the sides has means to engage and retain the blade terminal in the opening. The planar portion also has means to make at least one side resilient relative to the other side.

These objects can also be attained by a low profile connector for mating between a blade terminal and a flat flexible cable having a housing with a cable receiving cavity and a terminal receiving cavity. A female terminal is mounted in the terminal receiving cavity and has two mating ends. One mating end is adapted to engage the blade terminal and the other mating end is adapted to engage the conductors on the flat flexible cable. One mating end includes a generally planar base portion that is transverse to the direction of insertion of the blade terminal. The base portion has an opening formed therein to receive the blade terminal. The opening is defined by two spaced-apart sides where each side is adapted to engage an opposing surface of the blade terminal when mated. The other mating end includes at least a flexible arm extending from the planar base portion bent to contact in the cable receiving cavity.

In either of the two embodiments the means to engage and retain the blade terminal may include a sawtooth shape formed in one side. Also, the means making the one side of the opening resilient may include an aperture adjacent the one side. The aperture could take the form of a slot parallel to the one side. With this arrangement, good connections to the input terminals of electric machines and apparatuses are assured, and such reliable connections can be made with an increased efficiency.

With the arrangement described above the input terminals of an electric machine or apparatus are inserted in the slits of the planar base of the connector terminal when the connector housing is applied and fixed to the casing of the electric machine or apparatus. In the assembled condition the input terminals of the electric machine or apparatus are fixedly caught by the slit edges of the connector terminals, thereby assuring the reliable electric connection therebetween. The terminals of the electric connector are not exposed beyond the connector housing, and therefore their tails cannot be deformed by exterior forces, thus assuring exact alignment of the slits and the input terminals of the electric machine or apparatus. Therefore, required electric connections can be made at an increased efficiency.

BRIEF DESCRIPTION OF THE DRAWINGS

Other objects and advantages of the present invention will be understood from the following description of preferred embodiments of the present invention which are shown in accompanying drawings.

DETAILED DESCRIPTION OF THE PREFERRED EMBODIMENT

Figure 1:
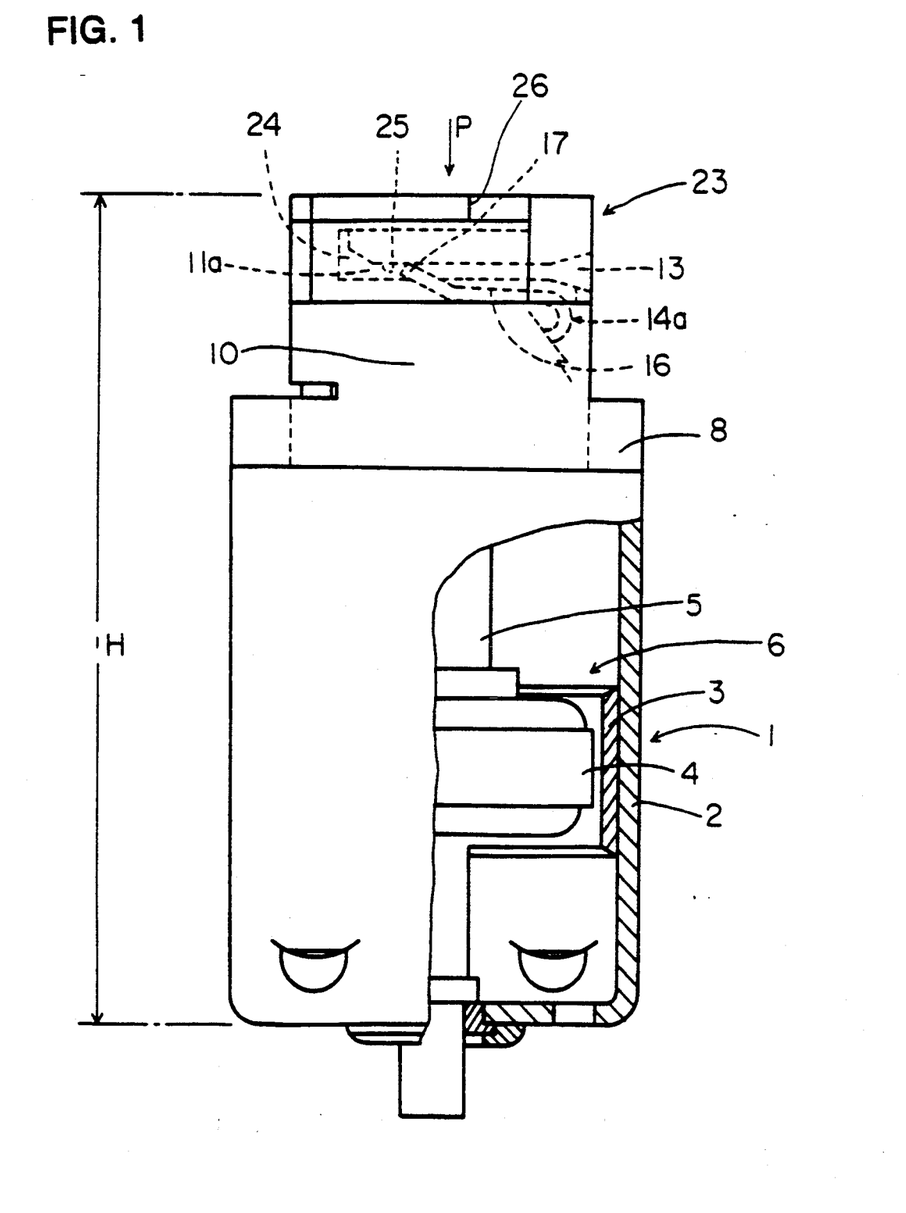
FIG. 1 is a front view of a small-sized electric motor equipped with an electric connector according to the present invention, with the electric motor shown in partial cross section.
Figure 2:
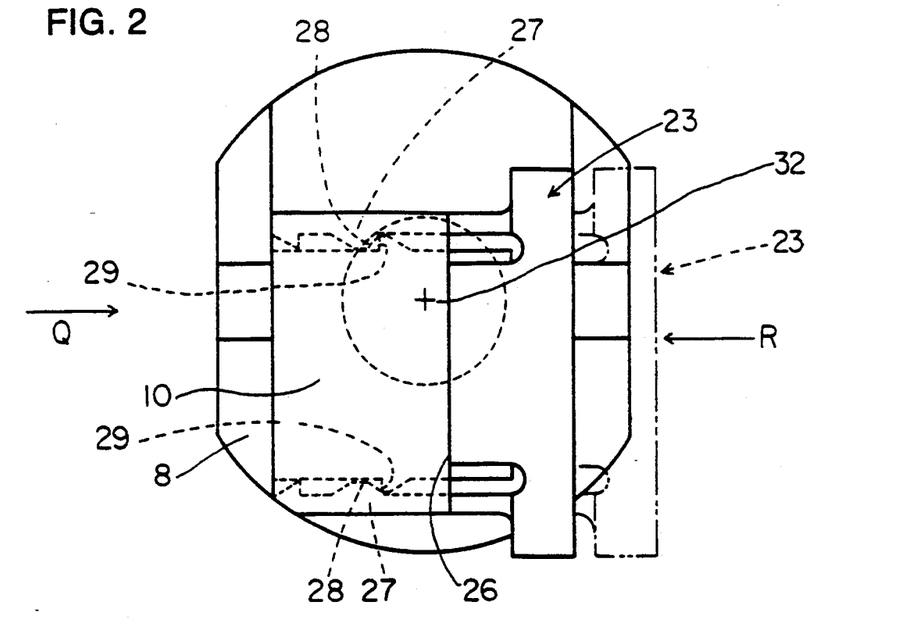
FIG. 2 is an end view of the small-sized electric motor as seen in the direction indicated by P in FIG. 1.
Figure 3:
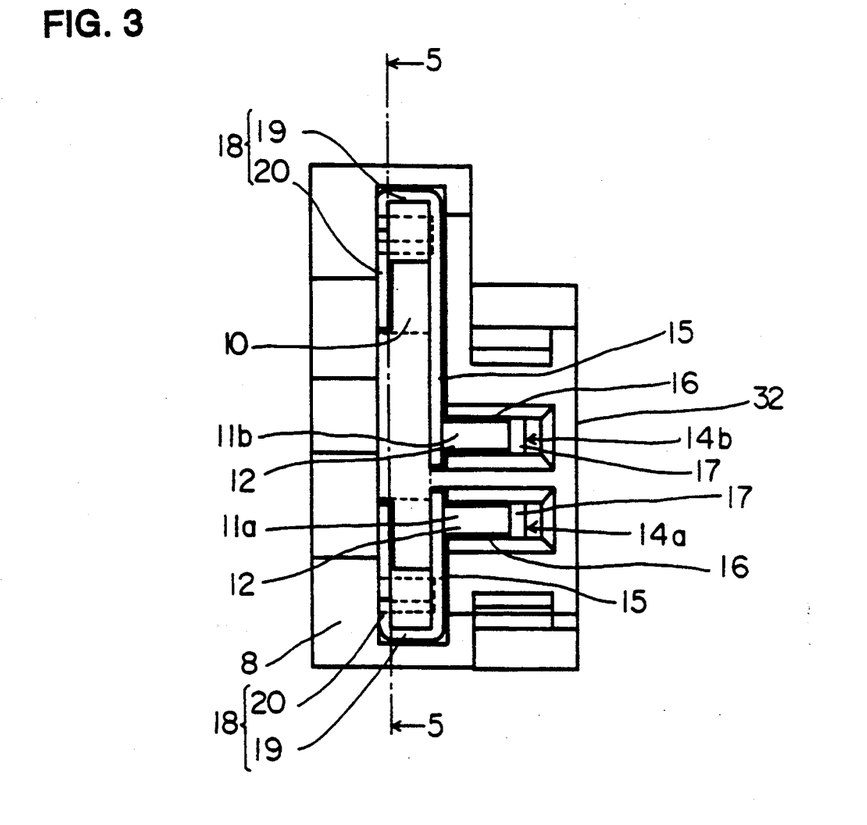
FIG. 3 is a side view of the connector housing as seen in the direction indicated by Q in FIG. 2.
Figure 4:
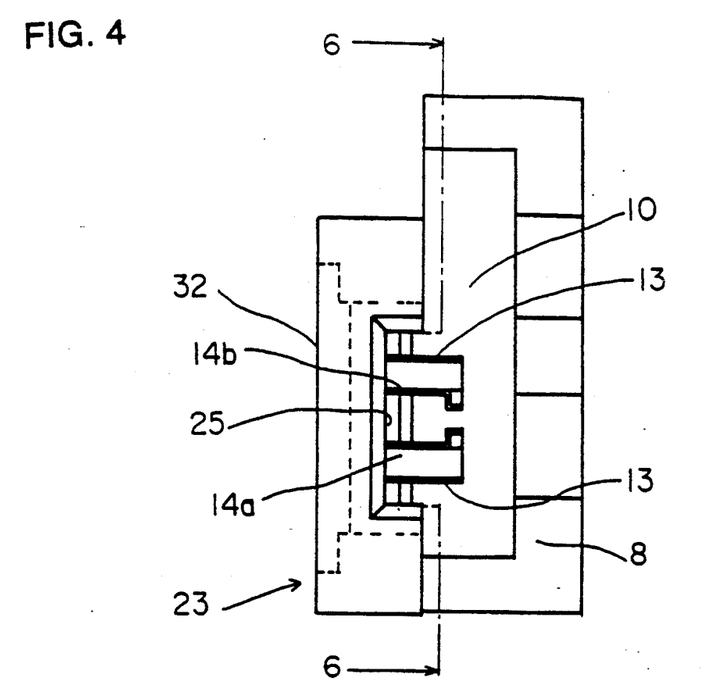
FIG. 4 is a side view of the connector housing as seen in the direction indicated by R in FIG. 2.

Referring to FIG. 1, a small-sized electric motor 1 comprises a hollow cylinder casing 2 of soft metal magnetic material, a permanent magnet 3 fixed to the inner surface of the hollow cylinder 2, and a rotor 6 in the hollow cylinder 2. The rotor 6 comprises an armature 4 facing the permanent magnet 3, and an associated rectifier 5.

Figure 5:
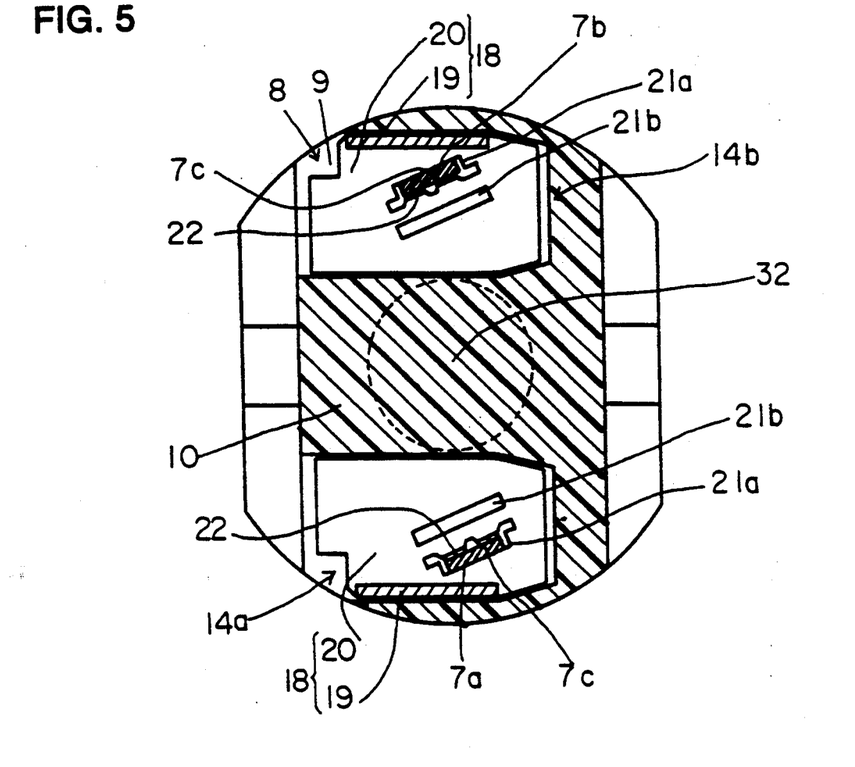
FIG. 5 is a longitudinal section of the connector housing taken along the line 5—5 and seen in the direction indicated by arrows in FIG. 3.

The input terminals 7a and 7b, as shown in FIG. 5, of the small-sized electric motor are electrically connected to the brushes, which are positioned in contact with the rectifier 5 of the armature 4. These input terminals 7a and 7b extend beyond surface 9 of the end plate 8 of the hollow cylinder 2. An electric connector housing 10 is integrally connected to the end plate 8.

Figure 6:
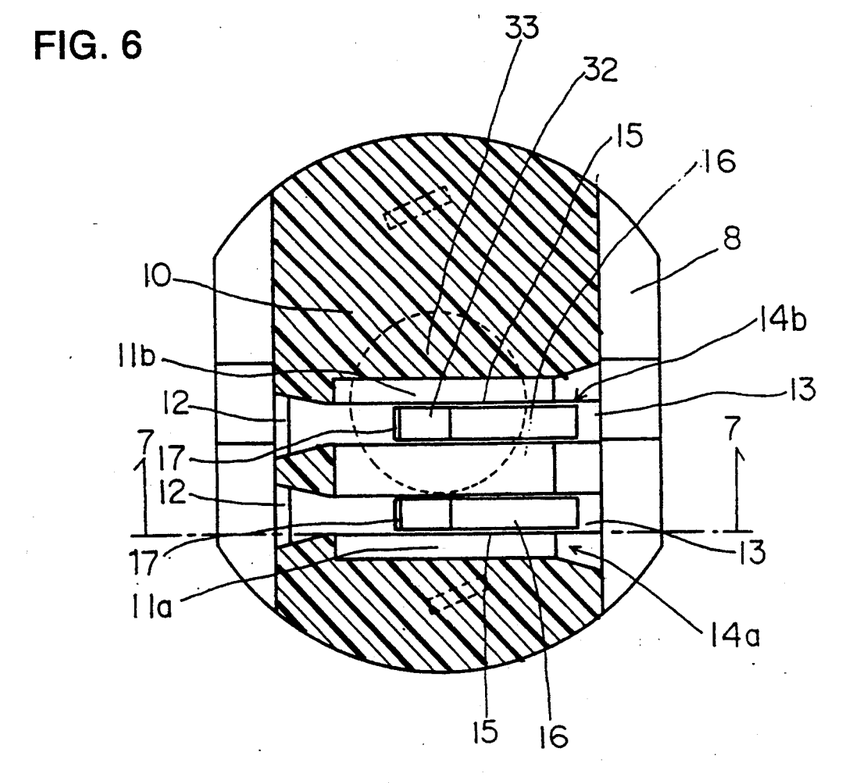
FIG. 6 is a longitudinal section of the connector housing taken along the line 6—6 and seen in the direction indicated by arrows in FIG. 6.
Figure 7:
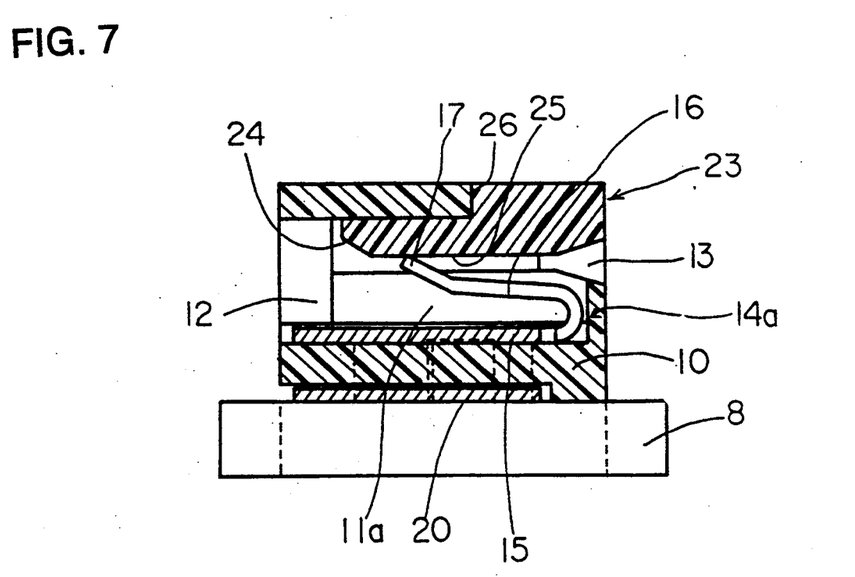
FIG. 7 is a longitudinal section of the connector housing taken along the line 7—7 and seen in the direction indicated by arrows in FIG. 6.

A pair of terminal-mounting spaces 11a and 11b are made laterally side by side. As seen from FIG. 6, these terminal-mounting spaces 11a and 11b communicate with each other, being offset from the center area 32 on one side thereof, leaving the solid portion 33 on the other side of the center area 32. With this offset arrangement the solid portion 33 of the connector housing 10 can have an anti-shock strength enough to prevent the connector housing 10 from being damaged by undesired shock, which may be caused for instance by an element placed at the center of the electric machine or apparatus, such as the shaft bearing of the small-sized electric motor when striking against the end plate 8 of the connector housing 10 at the time of assembly.

Each terminal-mounting space 11a or 11b has a terminal-insertion opening 12 on one side and a flat flexible cable (FFC) insertion opening 13 on the other side. In this example each terminal-mounting space 11a or 11b is parallel with a plane in which the end plate 8 lies. The FFC insertion opening 13 is made in a lateral direction 35 perpendicular to the direction in which the connector housing 10 is applied to the motor casing 2, thus permitting substantial reduction of the height H of the assembly.

Figure 10:
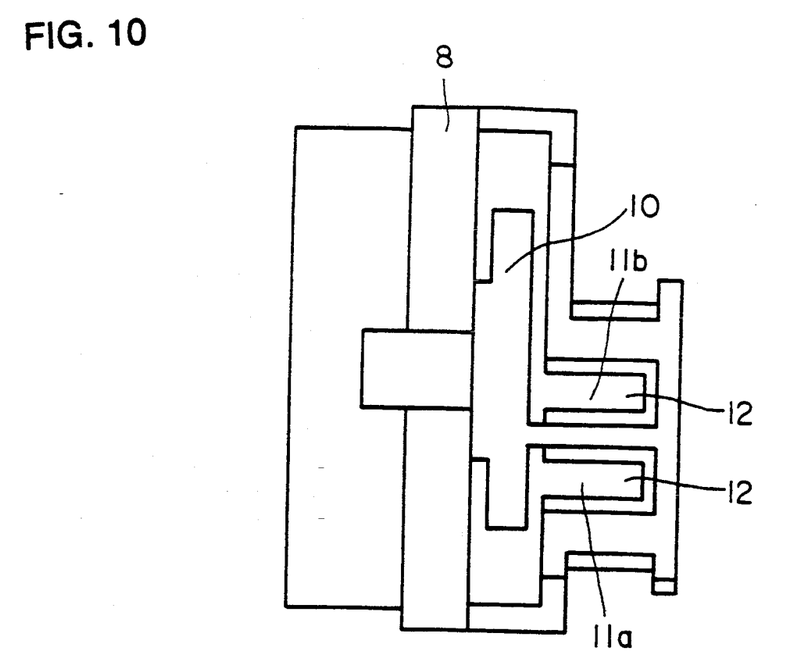
FIG. 10 is a side view of the connector housing as seen in the direction indicated by S in FIG. 8.
Figure 11:
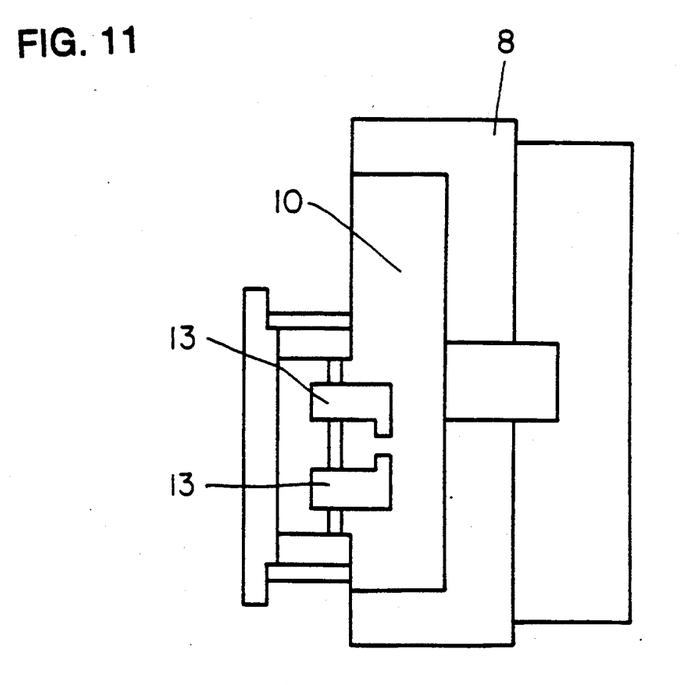
FIG. 11 is a side view of the connector housing as seen in the direction indicated by T in FIG. 8.
Figure 12:
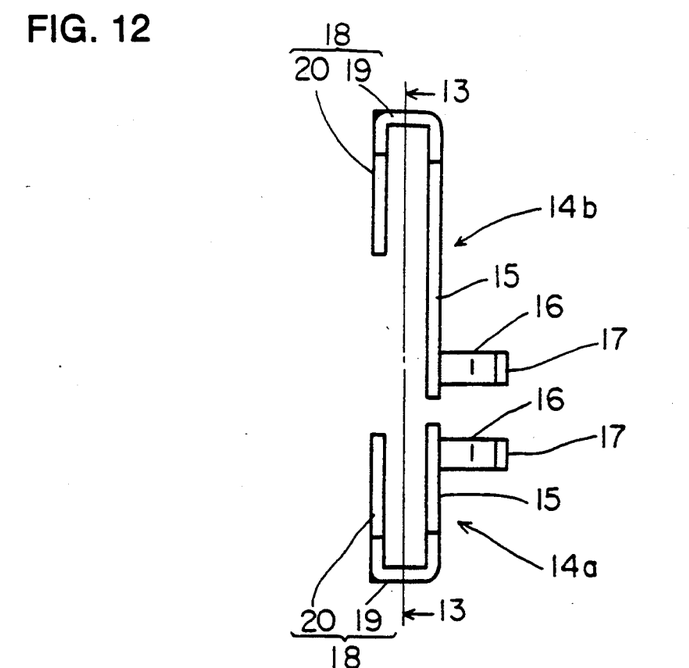
FIG. 12 is a side view of the terminal contacts as seen in the direction indicated by W in FIG. 9.
Figure 13:
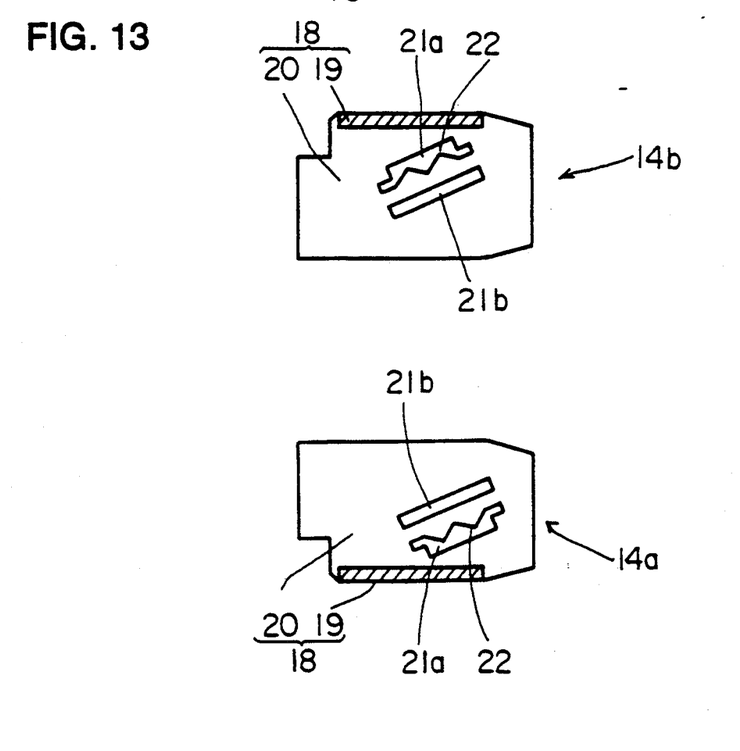
FIG. 13 is a longitudinal section of the terminal contacts taken along the line 13—13 and seen in the direction indicated by arrow in FIG. 12.

Referring to FIGS. 1 to 7, the terminals 14a and 14b are inserted into the terminal-mounting spaces 11a and 11b of the connector housing 10. FIGS. 10 and 1 show the connector housing 10 without the terminals 14a and 14b inserted. FIGS. 12 and 13 show the connector housing 10 with the terminals 14a and 14b inserted.

Since the terminals 14a and 14b have a similar shape, it suffices that only one of these terminals be described below. Terminal 14a which is similar in shape and function to terminal 14b comprises a base section 15, a "U"-shaped contact beam 16 integrally connected to and extending up and bent from the base section 15, a vertical side section 19 integrally connected to and extending down from the base section 15 and a horizontal section 20 integrally connected to and extending from the vertical side section 19 horizontally in parallel with the overlying base section 15. The vertical side section 19 and the horizontal section 20 are referred to together as making up a tail 18.

The "U"-shaped contact beam 16 extends on an angle upwardly to assure good contact with a conductor in an FFC or other conductor when inserted in the connector housing 10. The integral connection of base section 15, vertical side section 19 and horizontal section 20 defines a rectangular form to sandwich the raised floor of the connector housing between the base section 15 and the horizontal section 20, thus permitting the terminal contact to be fixedly held in the connector housing 10. The horizontal section 20 is laid on the end plate 8, closest to the motor casing 2. Therefore, even input terminals having short lengths projecting from the motor casing 2 can be put in contact with the horizontal section 20 of the terminal contact 14a.

The terminal contact 14a has slits 21a and 21b in its horizontal section 20. As seen from FIG. 13, the slit 21a has a notched or sawtooth edge 22 to make an electric connection with one or the other input terminal 7a or 7b of the electric machine or apparatus. The other slit 21b is parallel to the slit 21a, thereby facilitating the yieldingly-bending of the notched or sawtooth edge 22 of the slit 21a upon insertion of the input terminal 7a or 7b of the small-sized electric motor 1.

Figure 8:
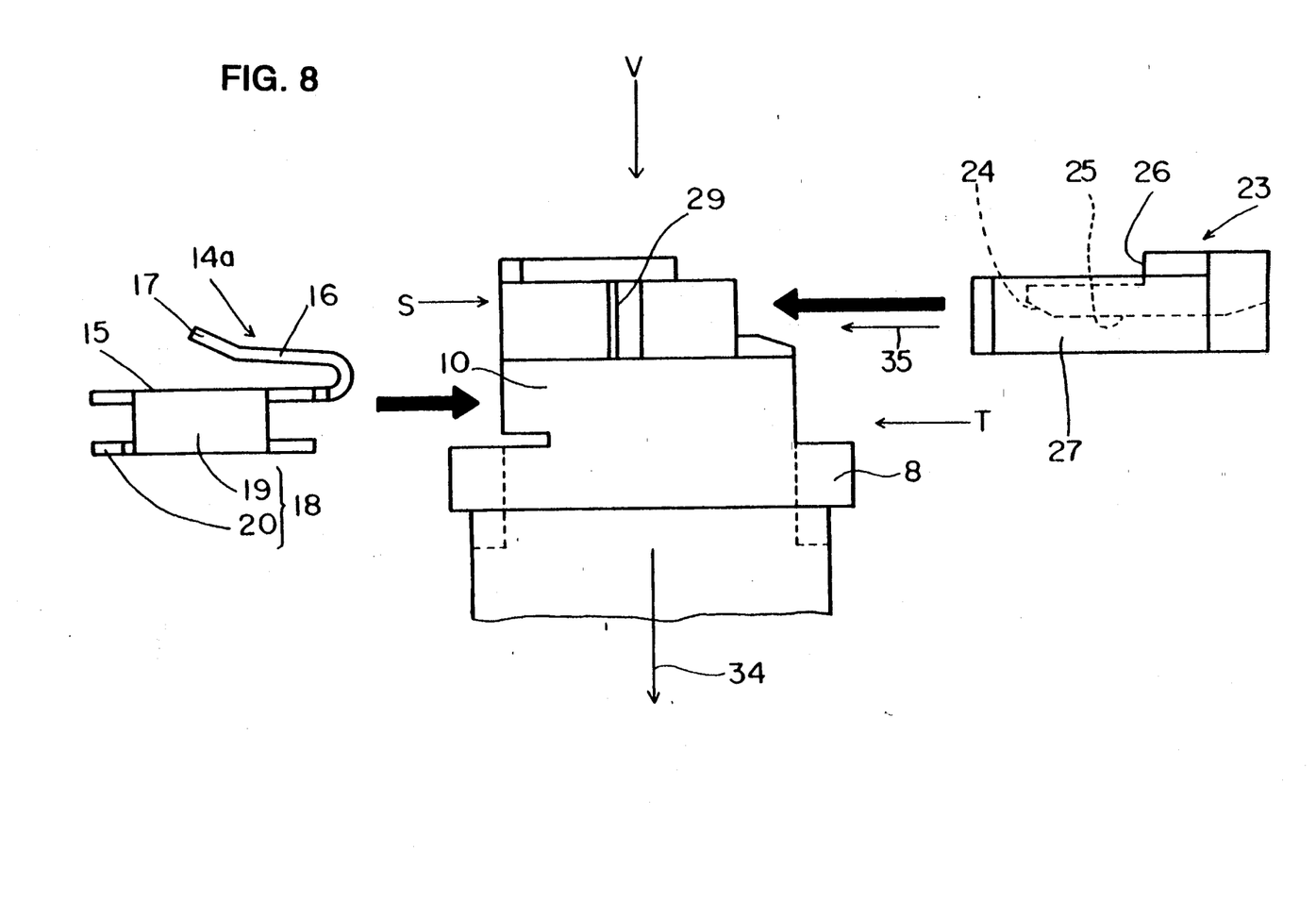
FIG. 8 shows how terminal contacts are mounted in the connector housing, and how an actuator is inserted in the connector housing.
Figure 9:
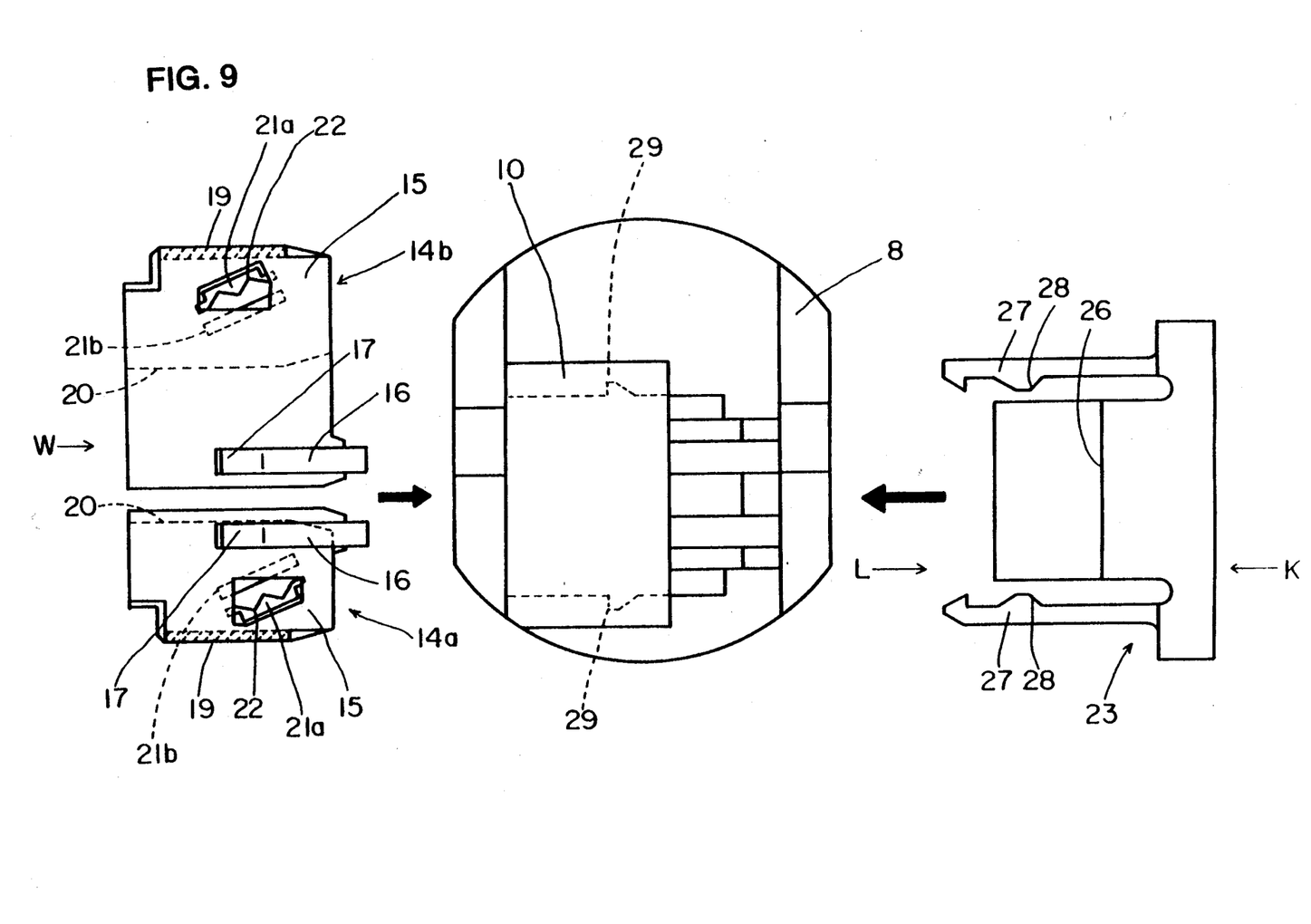
FIG. 9 is similar to FIG. 8, but showing the terminal contacts, the connector housing and the actuator as seen in the direction indicated by V in FIG. 8.

The terminals 14a and 14b are inserted in the terminal-mounting spaces 11a and 11b of the connector housing 10 with their "U"-shaped contact beams 16 directed to the terminal-inlet openings 12 of the terminal-mounting spaces 11a and 11b as shown in FIGS. 8 and 9 by inserting the terminals 14a and 14b in the terminal-mounting spaces 11a and 11b until the terminals 14a and 14b are fully inserted into the terminal-mounting spaces 11a and 11b as seen from FIGS. 1 to 7. In this fully inserted position the slits 21a of the horizontal sections 20 of the terminals 14a and 14b will be put in alignment with the input terminals 7a, 7b of the small-sized electric motor 1 when the input terminals 7a, 7b are attached to the end plate 8. After the terminals 7a and 7b are inserted in slits 21a not only will an electrical connection be made between terminals 14a and 14b and the input terminal 7a and 7b but also the connector housing 10 is fixed to the motor casing 2.

As described earlier, the terminals 14a and 14b are positively fixed to the connector housing 10 to prevent the slits 21a of the horizontal sections 20 from being displaced by external force in the connector housing 10, thus assuring the exact alignment of the notched or sawtooth edges of the slits 21a to the input terminals 7a and 7b of the small-sized electric motor 1. This will improve the efficiency with which electric connectors are integrated with small-sized electric motors. In this particular example each slit 21a is described and shown as having one side with a notched or sawtooth shape to assure good electric connections. However, flat-edged slits are still enough to assure reliable electric connections.

Figure 14:
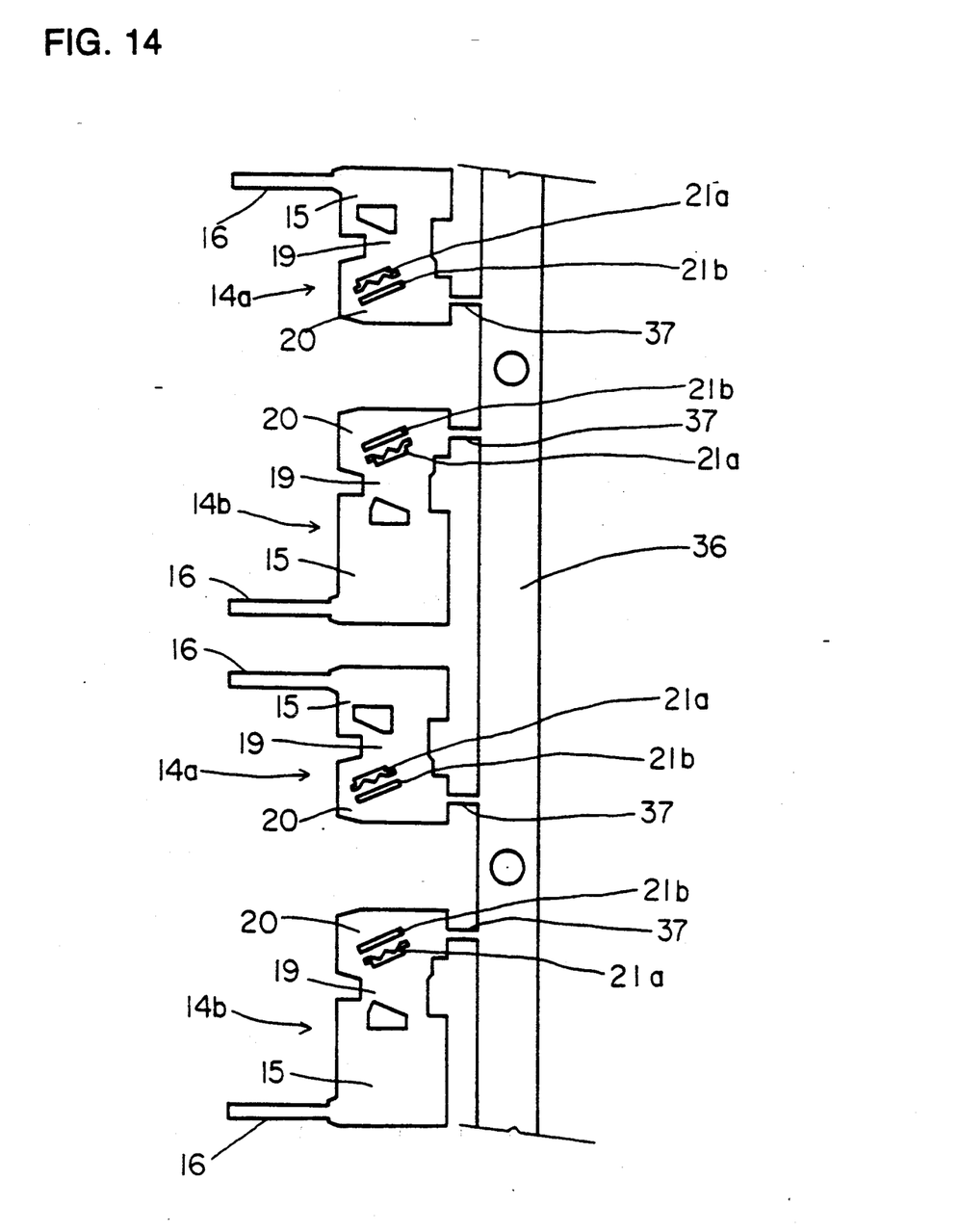
FIG. 14 is a plane view of terminal contacts prior to being separated from a carrier stem and prior to being bent to the final shape.

As seen from FIG. 14, a plurality of terminals 14a are punched from an elongated metal sheet, and these terminals 14a and 14b are connected to a carrier strip 36 via joints 37. The terminals 14a and 14b are bent to the required shape as described above, and pairs of terminal contacts 14a and 14b are inserted in connector housings 10. Finally the joints 37 are cut to separate the terminal contacts from the carrier strip 36.

Figure 15:
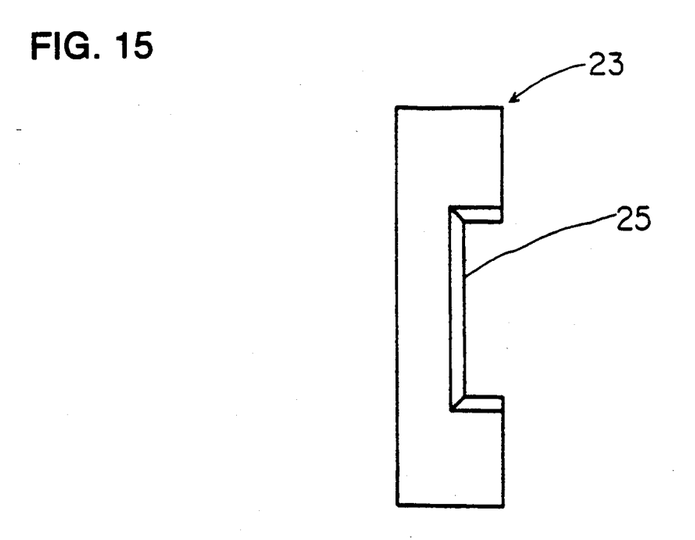
FIG. 15 is a front view of the actuator as seen in the direction indicated by arrow K in FIG. 9.
Figure 16:
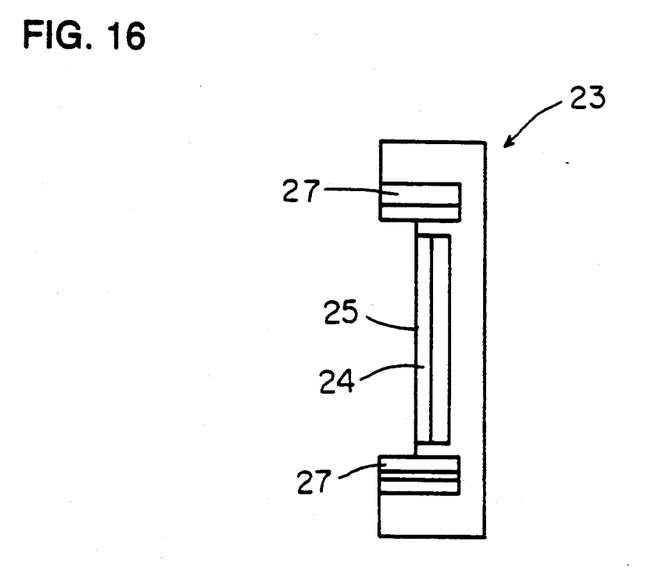
FIG. 16 is a rear view of the actuator as seen in the direction indicated by arrow L in FIG. 9.

An actuator 23 is used to connect or disconnect conductors 31 on the FFC 30 to or from the contact portions 17 of the respective contact beams 16. This actuator 23 is optional, and therefore electric connectors having no actuators are still useful. Electric connectors having actuators as shown in FIGS. 1 to 7 show the connector housing 10 having terminals 14a and 14b mounted therein, and FIGS. 8 and 9 show how the terminals 14a and 14b are inserted in the connector housing 10. FIGS. 15 and 16 show an actuator 23 having a tapered front 24 and a flat bottom 25. Also, it has a stopper section 26 rising from the ceiling surface to cause the actuator 23 to stop when fully inserted in the connector housing 10. As best seen in FIG. 9, the actuator 23 has lock arms 27 integrally connected to its opposite sides. Each lock arm 27 has a lock projection 28 formed on its inner side. Thus, when the actuator 23 is fully inserted in the connector housing 10, the lock projections 28 of the lock arms 27 are caught by counter projections 29 of the connector housing 10, thereby holding the actuator 23 in position.

Figure 17:
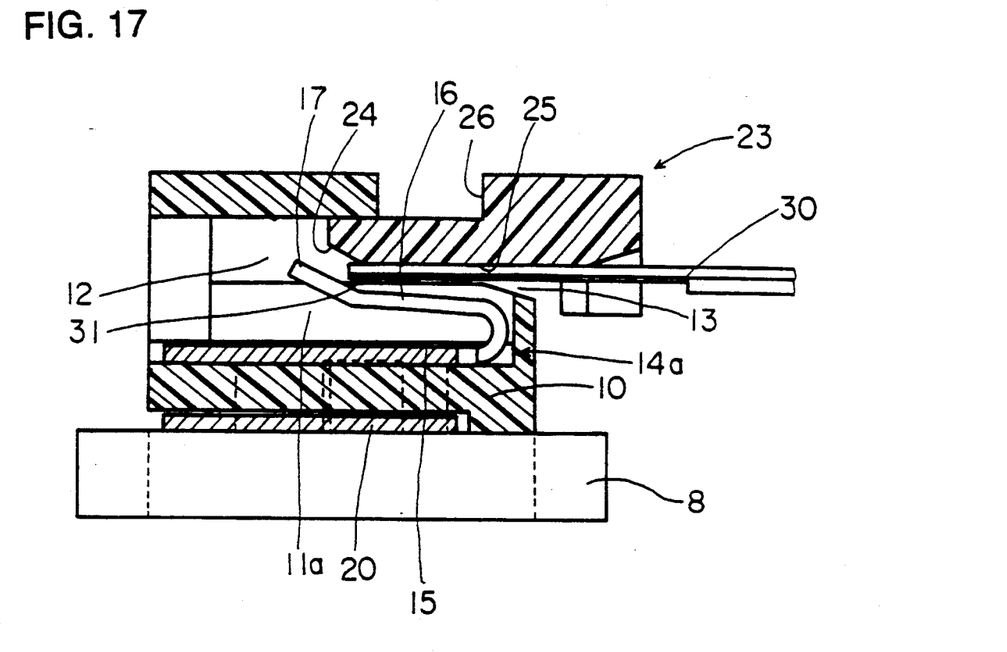
FIG. 17 shows, in section, the electric connector housing of the small-sized electric motor along with the actuator, showing how an FFC is inserted in or removed from the electric connector housing.
Figure 18:
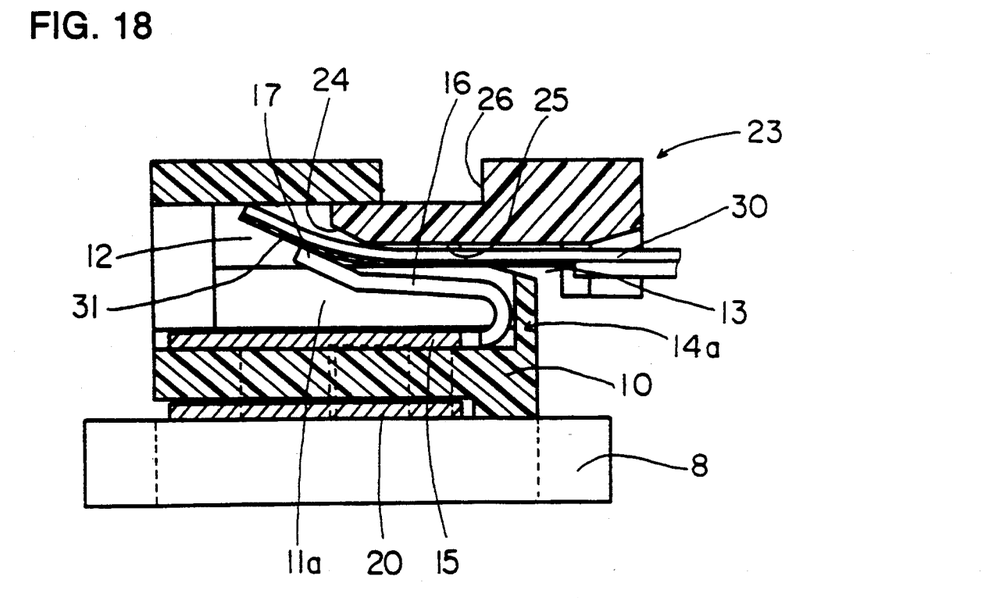
FIG. 18 shows, in section, the electric connector housing of the small-sized electric motor along with the actuator, showing the FFC inserted in the electric connector housing until it has reached the final position.
Figure 19:
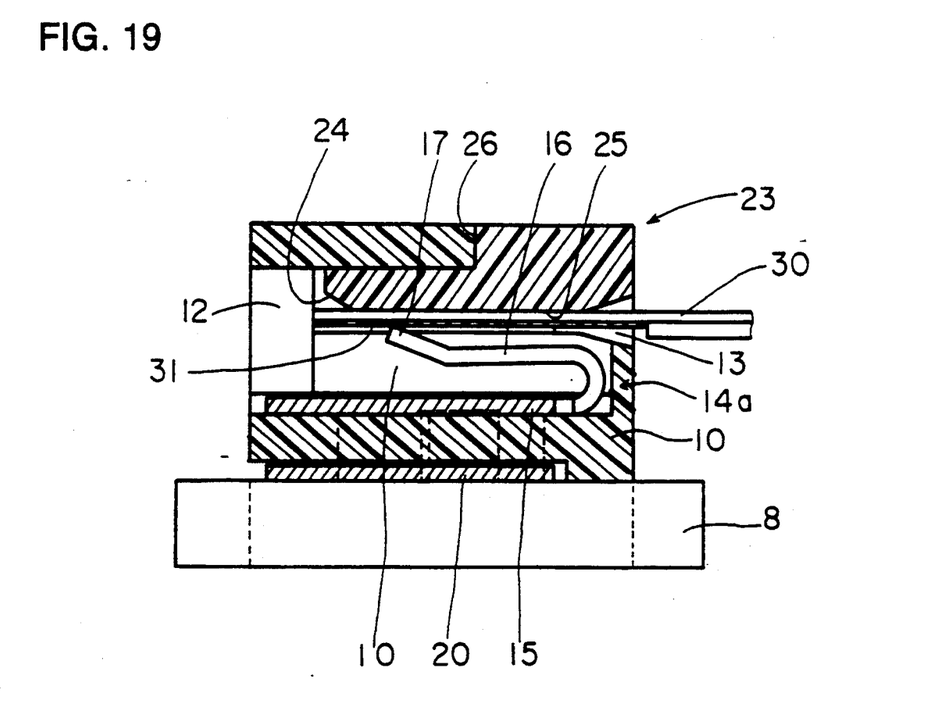
FIG. 19 shows, in section, both of the FFC and the actuator which are inserted in the electric connector housing until they have reached the final position.

FIGS. 17 to 19, generally depict the manner in which conductors 31 on FFC 30 are connected to and disconnected from the input terminals 7a and 7b of a small-sized electric motor 1.

As shown in FIG. 17, the front end of the actuator 23 is inserted in the inlet opening 13 of the connector housing 10 with an FFC 30 laid under the bottom surface 25 of the actuator 23. Specifically, two stripped conductors 31 extend from the FFC 30 at the same interval as the contact ends 17 of the terminals 14a and 14b in the connector housing 10, and are pushed toward the contact beams 16 of the terminals 14a and 14b in the connector housing 10.

As shown in FIG. 18, the FFC 30 is pushed forward until the stripped conductors 31 of the FFAC 30 have been inserted along the rising extensions of the "U"-shaped contact beams 16. In this position the stripped conductors 31 of the FFC 30 extend beyond the tapered end 24 of the actuator 23, but the stripped conductors 31 of the FFC 30 are not pressed with a high force against the contact ends 17 of the terminals 14a and 14b by the actuator 23. In this condition the contact ends 17 of the contact beams 16 will not rub against the stripped conductors 31 of the FFC 30 in the course of insertion.

As shown in FIG. 19, the actuator 23 is fully inserted until its stopper 26 has been caught by the connector housing 10. Then, the lock projections 28 of the opposite lock arms 27 are brought into engagement with the opposite counter projections 29 of the connector housing 10. In this position the stripped conductors 31 of the FFC 30 are pushed against the contact extensions 17 of the contact beams 16, and then the contact beams 16 are yieldingly bent down, thereby causing the resilient force to push themselves against the overlying conductors 31 of the FFC 30 with a force enough to assure good electric connection with the conductors 31 of the FFC 30. The conductors of the FFC can be disconnected from the terminal contacts 14a and 14b by operating the actuator 23 in the reversed order from FIG. 18 to FIG. 16 via FIG. 17. In the complete insertion of the FFC in the connector housing 10 the conductors 31 of the FFC 30, the contact ends 17 of the terminal contacts 14a and 14b and the input terminals 7a and 7b of the small-sized electric motor 1 are electrically connected.

In this particular example an FFC is described as having conductors arranged parallel at a predetermined interval or pitch, but two FFCs each having a single conductor may be used. Also, flat flexible cables called FPC or other cables for use in printed circuit boards such as PCBs can be equally used.

Figure 20:
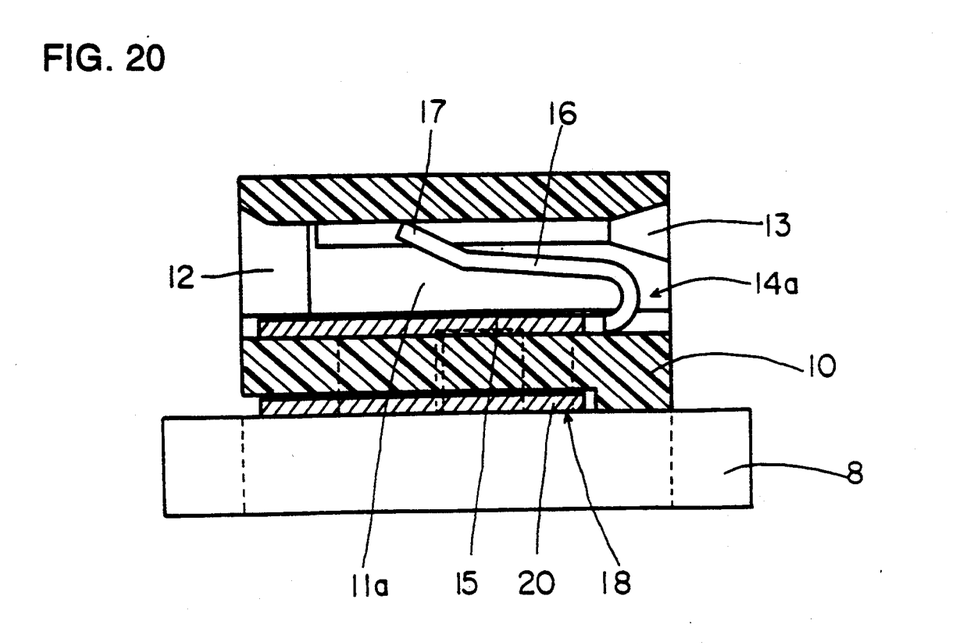
FIG. 20 shows, in section, another electric connector housing using no actuator.

FIG. 20 shows another connector structure using no actuator. One example of another electric machine and apparatus other than the small-sized motor is a relay.

It will be understood that the invention may be embodied in other specific forms without department from the spirit or central characteristics thereof. The present examples and embodiments, therefore, are to be considered in all respects as illustrative and not restrictive, and the invention is not to be limited to the details given herein.

We claim:

1. A low profile electrical connector for mating with a blade terminal including:
   a housing having a terminal receiving cavity; and
   a female terminal mounted in the cavity having a mating end to engage said blade terminal;
   the improvement comprising:

said mating end including a generally planar portion that is transverse to the direction of insertion of the blade terminal;

an opening formed in the planar portion to receive the blade terminal, said opening being defined by two spaced-apart sides, each side adapted to engage an opposing surface of the blade terminal when mated, one of said sides having means to engage and retain the blade terminal in the opening and means to make at least one side resilient relative to the other side; and said means making said one side resilient includes an aperture adjacent said one side, wherein said one side is flexed into said aperture upon insertion of said blade terminal into said opening;

whereby, the opening has the flexibility to receive insertion of the blade terminal therein with a minimum of force while retaining the blade terminal therein after insertion.

2. The connector of claim 1 wherein said means to engage and retain the blade terminal includes a sawtooth shape formed in said one side.

3. The connector of claim 1 wherein said aperture includes a slot parallel to said one side.

4. A low profile electrical connector for mating between a blade terminal and a flat flexible cable including:

a housing having a cable receiving cavity and a terminal receiving cavity; and a female terminal, mounted in said terminal receiving cavity and having two mating ends, one mating end adapted to engage the conductors on the flat flexible cable;

the improvement comprising:

said one mating end including a generally planar base portion that is transverse to the direction of insertion of the blade terminal, having an opening formed in the planar portion to receive the blade terminal, said opening being defined by two spaced-apart sides, each side adapted to engage an opposing surface of the blade terminal when mated;

one of said sides of said opening having means to make said side resilient relative to the other side;

said means making said one side of said opening resilient includes an aperture adjacent said one side, wherein said one side is flexed into said aperture upon insertion of said blade terminal into said opening; and the other mating end including at least a flexible arm extending from said planar base portion bent to contact a conductor on said flat flexible cable when said cable is inserted in said cable receiving cavity.

5. The connector of claim 4 wherein one of said spaced apart sides of said opening includes a saw-tooth shape formed therein.

6. The connector of claim 4 wherein said aperture includes a slot parallel to said one side.

* * * * *